United States Patent
Kato et al.

[15] 3,654,515
[45] Apr. 4, 1972

[54] LEAKAGE CURRENT INTERRUPTING APPARATUS

[72] Inventors: Tomio Kato; Hifumi Nitta, both of Kasugai, Japan

[73] Assignee: Chubu Seiki Kabushiki Kaisha, Aichi-ken, Japan

[22] Filed: June 9, 1970

[21] Appl. No.: 44,722

[30] Foreign Application Priority Data

June 26, 1969 Japan..................................44/60126
June 26, 1969 Japan..................................44/60127
Jan. 23, 1970 Japan..................................45/6534

[52] U.S. Cl............................317/18 D, 317/27 R, 340/255
[51] Int. Cl.......................................................H02h 3/28
[58] Field of Search................317/18 D, 27 R; 340/255

[56] References Cited

UNITED STATES PATENTS

| | | | |
|---|---|---|---|
| 3,213,321 | 10/1965 | Dalziel | 317/18 D |
| 3,376,477 | 4/1968 | Weinger | 317/18 D X |
| 3,319,123 | 5/1967 | Scanlan | 317/18 D |
| 3,286,129 | 11/1966 | Gagniere | 317/18 D |

*Primary Examiner*—James D. Trammell
*Attorney*—Curt M. Avery, Arthur E. Wilfond, Herbert L. Lerner and Daniel J. Tick

[57] ABSTRACT

In a leakage current interrupting apparatus for feeder lines a zero-phase current transformer is associated with the feeder lines to trip a circuit interrupter through a control means responsive to the secondary voltage of the zero-phase current transformer. The control means is comprised by a magnetic reed relay or a unidirectional three-terminal element such as a silicon controlled rectifier element.

1 Claim, 6 Drawing Figures

INVENTORS
Tomio KATO
AND
Hifumi NITTA

INVENTORS
Tomio KATO
AND
HIFUMI NITTA

INVENTORS
TOMIO KATO
AND
HIFUMI NITTA

LEAKAGE CURRENT INTERRUPTING APPARATUS

BACKGROUND OF THE INVENTION

This invention relates to improvement of leakage current interrupting apparatus for interrupting a feeder on which a leakage fault has occurred and more particularly to a leakage current interrupting device wherein a leakage current caused by deterioration of electric insulation of a load or of an electric line or a feeder supplying power thereto is detected by a zero-phase current transformer to provide a signal to interrupt a circuit interrupter connected in the feeder.

It has been the common practice to ground protective sheaths of feeders and frames of electric machines and apparatus. Even when the value of their grounding resistance is maintained at a preset value or thereunder, upon the occurrence of a leakage fault or current it is almost impossible to maintain their potential to ground at a low safe value for human bodies.

One prior approach to this problem involves one grounding line (usually the neutral line) of a feeder to a grounded electrode, such as an underground water pipe at the entrance of a customer dwelling. Such a grounding connection is also used to ground the machine frame and the like to develop a short circuit condition when a leakage current occurs in such machine thereby causing instantaneous interruption of a fuse or a feeder circuit interrupter to clear the leakage.

Even when a water pipe is utilized for grounding the machine, it is not always possible to obtain a ground potential having a sufficiently safe value for human bodies, because the ground potential is greatly influenced by the condition of the ground in which the water pipe is buried. Further, if the leakage is permitted to continue for a long interval of time, it causes a fire hazard. Moreover the prior art leakage current interrupting apparatus is not advantageous in that its construction is complicated, sensitivity is low and the operation is unstable.

SUMMARY OF THE INVENTION

It is therefore an object of this invention to provide a novel leakage current interrupting apparatus which can obviate the prior disadvantages described above and which can operate positively and stably even when the signal detect by a zero-phase current transformer is small.

Another object of this invention is to provide an improved leakage current interrupting apparatus wherein a zero-phase current transformer is connected in a feeder supplying power to a load to detect the zero-phase current caused by the leakage current so as to control the circuit interrupter of the feeder.

Still another object of this invention is to provide a novel leakage current interrupting apparatus in which a magnetic reed switch is connected across the secondary winding of a zero-phase current transformer connected in series with a feeder line thereby to energize and trip a circuit interrupter.

A further object of this invention is to provide an improved leakage current interrupting apparatus in which a magnetic reed switch is premagnetized by a permanent magnet so as to positively operate the circuit interrupter with a small leakage current.

Yet another object of this invention is to provide a novel leakage current interrupting apparatus wherein there is provided another magnetic reed switch responsive to an output signal of a different level from a zero-phase current transformer in addition to the normal magnetic reed switch for energizing the circuit interrupter thereby to drive an alarm device to provide an audible alarm to indicate the leakage current.

Still another object of this invention is to provide a leakage current interrupting apparatus wherein an output signal from a zero-phase current transformer is applied to a gate electrode of a unidirectional three-terminal element to operate a circuit interrupter through a relay.

BRIEF DESCRIPTION OF THE DRAWING

Further objects and advantages of the invention can be more fully understood from the following detailed description when taken in conjunction with the accompanying drawings, in which.

DESCRIPTION OF THE PREFERRED EMBODIMENTS

Figure 1:
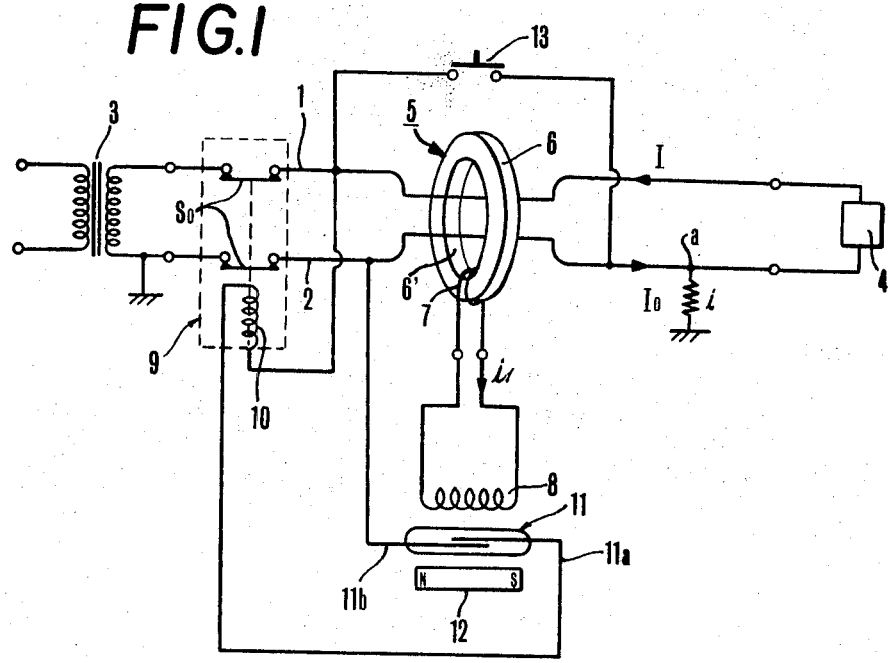
FIG. 1 is a connection circuit diagram of one embodiment of the novel leakage current interrupting apparatus of the invention.

Referring now to FIG. 1 of the accompanying drawings, each end of the feeder lines 1 and 2 is connected to the opposite terminals of the secondary winding of a step down transformer 3 which may be mounted on a pole of a distribution system. The other ends of feeder lines 1 and 2 are connected to a load 4 such as, for example, an electric motor, a washing machine or an illuminating device. A zero-phase transformer 5 having a toroidal core 6 wound with a secondary winding 7 is provided. The feeder lines 1 and 2 extend through the window of the core 6 to transform the zero-phase component of the load current to an output voltage. An exciting coil 8 of a magnetic reed switch 11 is connected across the secondary winding 7. A manual reset circuit interrupter 9 is connected in series with the feeder lines on the source side thereof. The circuit interrupter 9 comprises the main contacts So and a trip coil 10 connected in series with the terminals 11a and 11b of the magnetic reed switch 11. The magnetic reed switch 11 is provided with a permanent magnet 12 to premagnetize the armatures of said switch. A push button 13 is connected to the feeder lines 1 and 2 to short-circuit said feeder lines to test the leakage current interrupting apparatus.

In the absence of any leakage current or where primary currents I and Io flowing through the feeder lines 1 and 2 are equal, magnetomotive forces in the core 6 produced by these currents cancel each other so that no voltage will be induced across the secondary winding 7. However, when current $i$ leaks to the ground at a point $a$ on line 2 due to the insulation deterioration of the feeder line 2, for example, as shown in FIG. 1, then $I_0 - i = I$ and hence $I_0 > I$. Consequently a voltage is induced across the secondary winding 7 of the zero-phase current transformer due to leakage current $i$. This energizes the coil 8 with secondary current $i_1$ to close the reed switch 11. Since alternating current flows through the feeder lines, the direction of the magnetic flux produced by the coil 8 alternates with the same frequency, thus causing the magnetic reed switch 11 to switch ON and OFF repeatedly at the frequency of the source. However, the trip coil 10 is energized at the first closure of the reed switch 11 to interrupt the circuit interrupter, thus clearing the fault.

Figure 2:
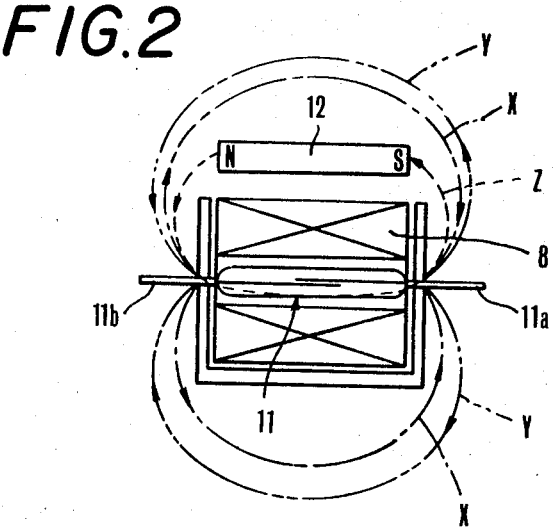
FIG. 2 is a diagram to explain the operation of a magnetic reed switch for controlling the circuit interrupter shown in FIG. 1.
Figure 3:
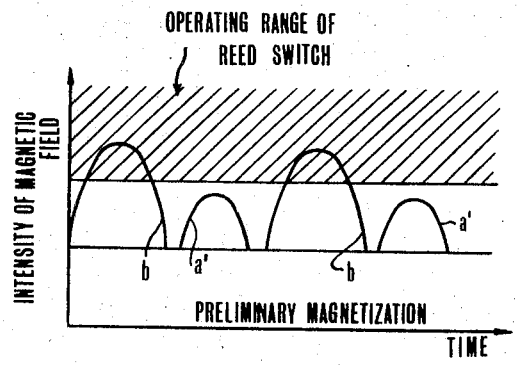
FIG. 3 is a graphical presentation for explaining the relationship between the intensity of the magnetic field and the operating range of the magnetic reed switch.

However, when the value of the leakage current $i$ flowing through the primary side is very small, say of the order of several milliamperes, the voltage will be induced in the secondary winding of the zero-phase current transformer and hence the current $i_1$ flowing through the coil 8 is also small and is insufficient to operate the magnetic reed switch. When the direction of the magnetic flux produced by coil 8 coincides with that of the magnetic flux produced by the permanent magnet 12, however, these two fluxes cooperate cumulatively upon the magnetic reed switch 11 to close it. More particularly, as shown in FIG. 2, the reed switch 11 is premagnetized by the magnetic flux Z produced by the permanent magnet 12 upon which the magnetic fluxes X and Y of the opposite polarity produced by the coil 8 are superposed alternately. Since the magnetic flux X is in the opposite direction from the magnetic flux Z produced by the permanent magnet 12, the value of the resultant $a$ of these magnetic fluxes X and Z does not reach the operating range of the reed switch 11, as shown in FIG. 3. For this reason, the reed switch will not operate. In the opposite half cycle, however, the flux, $x$ is added cumulatively to the flux Z, so that the value of the resultant $b$ of these magnetic fluxes reaches the operating range of the reed switch, thus causing it to close, as shown in FIG. 3.

Thus, this invention provides a novel leakage current interrupting apparatus of improved sensitivity wherein leakage current due to deterioration of insulation or the like is detected by means of a zero-phase current transformer associated with feeder lines and the output of the zero-phase current transformer is utilized to trip a manual reset type circuit interrupter connected in series with the feeder lines.

Moreover, according to this invention a magnetic reed switch is used to respond to the fault signal detected by the zero-phase current transformer. The circuit construction and arrangement are very simple. Premagnetization of the reed switch by the permanent magnet improves the sensitivity of the leakage current interrupting apparatus so that it can detect even a very small leakage current. In addition, the novel leakage current interrupting apparatus has an excellent temperature characteristic and does not operate erroneously in response to surge voltages of the feeder lines.

Figure 4:
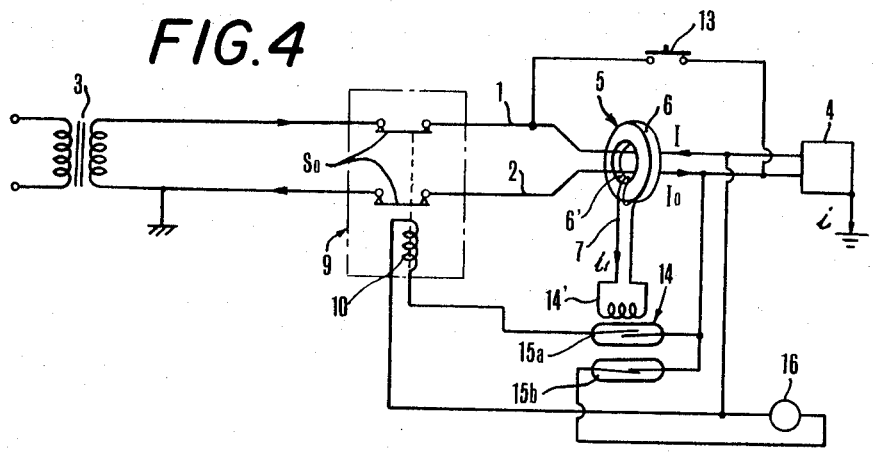
FIG. 4 is a circuit diagram of a modified embodiment of this invention.

The embodiment shown in FIG. 4 is identical to that shown in FIG. 1, except that a reed switch 14 energized by the zero-phase transformer 5 includes two reed switches 15a and 15b of different sensitivities. More particularly, the reed switch 15a is connected in series with the trip coil 10 of the circuit interrupter 9 and has a lower sensitivity than the reed switch 15b, which is, connected in series with an audible alarm device 16, such as a buzzer. Accordingly, when leakage current begins to flow through the feeder lines, the magnetic reed switch 15b first closes to operate audible alarm device 16 and when the leakage current increases further the reed switch 15a is also actuated to energize the trip coil 10 to operate the circuit interrupter 9 to interrupt the circuit.

Figure 5:
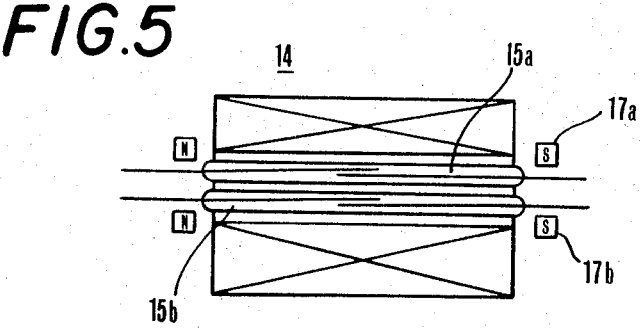
FIG. 5 is a diagram of still another embodiment of this invention wherein permanent magnets are added to the magnetic reed switches to premagnetize the same.

In the modified embodiment shown in FIG. 5, the sensitivity of the reed switch 14 is improved by a pair of permanent magnets 17a and 17b associated with reed switches 15a and 15b, respectively. The magnets 17a and 17b premagnetize the reed switches 15a and 15b, thus operating the circuit interrupter and the alarm device at a smaller leakage current. By selecting the preliminary magnetizing field produced by the magnet 17a higher than that produced by magnet 17b, the switch 15b operates first to operate the audible alarm device 16 before tripping the circuit breaker 9. Furthermore, by varying the intensity of the magnetic fields of the magnets 17a and 17b acting upon the reed switches 15a and 15b, the operating points of the alarm device and the circuit interrupter can be varied.

Figure 6:
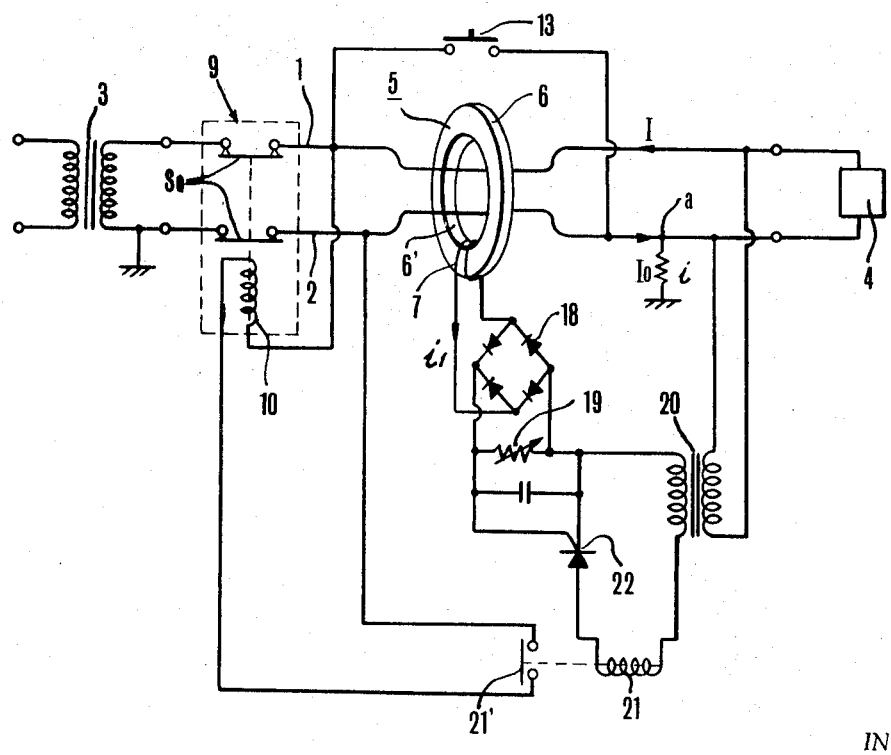
FIG. 6 shows a circuit diagram of yet another modification of this invention.

In another embodiment of the apparatus of our invention, shown in FIG. 6, the input terminals of a diode full wave rectifier 18 are connected across the secondary winding 7 of the zero-phase current transformer 5. The output terminals of the rectifier 18 are connected to the opposite terminals of a variable resistor 19 for sensitivity adjustment. The primary winding of an auxiliary transformer 20 is connected across the feeder lines 1 and 2 while the secondary winding is connected across a relay 21. The relay 21 has a normally opened contact 21' via the anode and cathode electrodes of a unidirectional three-terminal element such as, for example, a silicon controlled rectifier element 22. The gate and cathode electrodes of the silicon controlled rectifier element 22 are connected to the opposite terminals of a variable resistor 19 to apply a trigger signal to the gate electrode, thus energizing the trip coil 10 of the circuit breaker 9. Thus, the silicon controlled rectifier element operates in the same manner as the reed relay in the previous embodiments.

While the invention has been shown and described in terms of some preferred embodiments thereof it is to be understood that this invention is not limited to these particular embodiments and that many modifications may be made without departing from the true spirit and scope of the invention as defined in the appended claims.

What is claimed is:

1. Leakage current interrupting apparatus for a load energized by a source of electrical power supply, comprising feeder lines connected between the source of supply and the load; a trip coil having main contacts connected in the feeder lines for opening the feeder lines, said trip coil controlling the positions of the main contacts; a zero-phase current transformer having a toroidal core having a window surrounding the feeder lines and a secondary winding on the core for producing an output voltage when a leakage current flows through the feeder lines; a first magnetic reed switch connected in series with the trip coil between one end of the trip coil and one of the feeder lines for controlling the energization of said trip coil to control the position of the main contact; audible alarm means; a second magnetic reed switch connected in series with the audible alarm means for controlling the energization of the alarm means to provide an audible alarm, the second reed switch having a greater sensitivity than the first reed switch; and an exciting coil connected in series with the secondary winding of the transformer and positioned in operative proximity with the first reed switch for producing a magnetic flux for controlling the operation of said first reed switch thereby controlling the operation of the trip coil and for controlling the operation of the second reed switch to produce an audible alarm.

* * * * *